(12) United States Patent
Takahashi

(10) Patent No.: US 8,761,581 B2
(45) Date of Patent: Jun. 24, 2014

(54) EDITING DEVICE, EDITING METHOD, AND EDITING PROGRAM

(75) Inventor: Yasuaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 13/267,951

(22) Filed: Oct. 7, 2011

(65) Prior Publication Data

US 2012/0093485 A1    Apr. 19, 2012

(30) Foreign Application Priority Data

Oct. 13, 2010 (JP) ................ P2010-231005

(51) Int. Cl.
*H04N 5/76* (2006.01)

(52) U.S. Cl.
USPC ........................................... 386/278

(58) Field of Classification Search
USPC ........................................... 386/278
See application file for complete search history.

(56) References Cited

U.S. PATENT DOCUMENTS

| | | | | |
|---|---|---|---|---|
| 6,014,454 | A * | 1/2000 | Kunkler ............... | 382/137 |
| 6,321,024 | B1 * | 11/2001 | Fujita et al. ............ | 386/281 |
| 6,405,169 | B1 * | 6/2002 | Kondo et al. .......... | 704/258 |
| 7,546,532 | B1 * | 6/2009 | Nichols et al. ........ | 715/716 |
| 2002/0154140 | A1 * | 10/2002 | Tazaki ................... | 345/620 |
| 2005/0166150 | A1 * | 7/2005 | Chu ....................... | 715/723 |
| 2006/0233514 | A1 * | 10/2006 | Weng et al. ............ | 386/46 |
| 2008/0016245 | A1 * | 1/2008 | Cunningham et al. | 709/246 |
| 2009/0049467 | A1 * | 2/2009 | Robson et al. ........ | 725/28 |
| 2009/0074375 | A1 * | 3/2009 | Ramasubramaniam et al. ..................... | 386/52 |
| 2011/0002512 | A1 * | 1/2011 | Uehara et al. ......... | 382/128 |

FOREIGN PATENT DOCUMENTS

JP    2009-136129    6/2009

* cited by examiner

*Primary Examiner* — Thai Tran
*Assistant Examiner* — William Tran
(74) *Attorney, Agent, or Firm* — Sony Corporation

(57) ABSTRACT

An editing device includes an editing unit that partially edits content constituted of a plurality of clips using the clip as a unit, the clip including a moving image; a measurement unit that, each time the edited part of the content is reproduced by the editing unit, by measuring the part as each single reproduction of the clip which includes the interior portions or the connection points, measures the total count of the respective plurality of clips; a clip setting unit that sets each of the plurality of clips to at any of a plurality of types of clip based on the measured total count; a mark adding unit that performs an image process for adding a mark in accordance with the set type to at least a part of the content; and a reproduction control unit that controls reproduction of the content being subjected to the image process.

18 Claims, 12 Drawing Sheets

FIG. 7

| CLIP NUMBER | SCENE NUMBER | EDITING START POINT | EDITING END POINT | REPRODUCTION NUMBER | TOTAL REPRODUCTION NUMBER |
|---|---|---|---|---|---|
| CL1 | SC1 | t0 | t5 | 3 | 3 |
| CL2 | SC1 | t11 | t13 | 5 | 7 |
| | SC2 | t12 | t15 | 2 | |
| ... | ... | ... | ... | ... | ... |

EDITING DEVICE, EDITING METHOD, AND EDITING PROGRAM

BACKGROUND

The present disclosure relates to an editing device, an editing method, and an editing program, which easily realizes confirmation without leakage of edited content.

In the related art, an editing device may partially edit content data constituted of moving images or audios by an editing operation of an editor. In this case, the editor reproduces a part of the edited content each time performs the editing operation to thereby confirm the edited content. Next, when the editing operation is completed, the editor reproduces all the content after the editing operation to thereby perform a final confirmation (see, Japanese Unexamined Patent Application Publication No. 2009-246989).

SUMMARY

However, for the editor, it is difficult to consistently maintain constant concentration when reproducing all the content for the purpose of the final confirmation. In particular, since the editor tires of watching the corresponding content which is repeatedly reproduced to confirm a part of the edited content, the concentration of the editor wanes during reproduction before and after editing. In this manner, when the concentration of the editor wanes during final confirmation, there is concern that the editor may make the final decision that the edited content has no problem without being aware of incompleteness in the editing of content data, even when editing is incomplete. In this case, content in a state of incomplete editing may be created.

The present disclosure has been made in view of such circumstances, and it is desirable that confirmation without leakage of edited content be easily realized.

According to an embodiment of the present disclosure, there is provided an editing device, including: an editing unit that partially edits content constituted of a plurality of clips using the clip as a unit, the clip including a moving image; a measurement unit that, each time the edited part of the content is reproduced by the editing unit, by measuring the part as each single reproduction of the clip which includes the interior portions or the connection points, measures the total count of the respective plurality of clips which constitutes the content; a clip setting unit that sets each of the plurality of clips constituting the content to at any of a plurality of types of clip based on the total count measured by the measurement unit; a mark adding unit that performs an image process for adding a mark in accordance with the set type by the clip setting unit to at least a part of the content; and a reproduction control unit that controls reproduction of the content being subjected to the image process by the mark adding unit.

The clip setting unit may, from among the each of the clips of the plurality constituting the content, set a clip for which the total count is equal to or less than a first threshold value to a first type, a clip for which the total count is equal to or greater than a second threshold value which is larger than the first threshold value to a second type, and set other clips to a third type, and the mark adding unit may add a first mark to a clip set as the first type, and add a second mark to a clip set as the second type.

When at least one of the first clips is included in each of m clips (m being an integer of 1 or more) scheduled for reproduction, the mark adding unit may add a third mark to a clip set as the third.

The third mark may be a mark which flickers.

The mark may be an outer frame disposed at the outer periphery of the clip.

The editing device may further include an input unit that receives various instructions according to the input operations of a user, and the clip setting unit may set the plurality of clips to any of the plurality of types based on instructions received by the input unit.

The editing unit may edit the joining point of adjacent two clips, and when the joining point is reproduced, the measurement unit may measure this as one playback for each of the two adjacent clips.

When content of at least one of two clips connected by a predetermined connection point is changed by editing by the editing unit, the measurement unit may reset the total reproduction count for each of the two clips.

The third mark may be a mark having a function indicating the interval until the clip to which the first mark is added is reproduced.

An editing processing method and program according to another embodiment of the present disclosure are a method and a program corresponding to the above described editing device according to an embodiment of the present disclosure.

In the editing device, method, and program according to the embodiment of the present disclosure, content constituted of a plurality of clips may be partially edited using the clip as a unit. Here, the clip may include a moving image. Also, a total count of each of reproduction of the plurality of clips constituting the content may be measured by measuring the part as each single reproduction of the clip which includes the interior portion and the connection point each time the edited part is reproduced.

Each of the plurality of clips constituting the content may be set to at any of a plurality of types of clip based on the measured total count, an image process for adding a mark in accordance with the set type to at least a part of the content may be performed, and reproduction of the content having been subjected to the image process may be controlled.

As described above, according to the present disclosure, it is possible to easily realize confirmation without leakage edited content.

BRIEF DESCRIPTION OF THE DRAWINGS

FIG. 7 is a diagram showing an example of an editing table;

DETAILED DESCRIPTION OF EMBODIMENTS

[Configuration Example of Editing Device]

Figure 1:
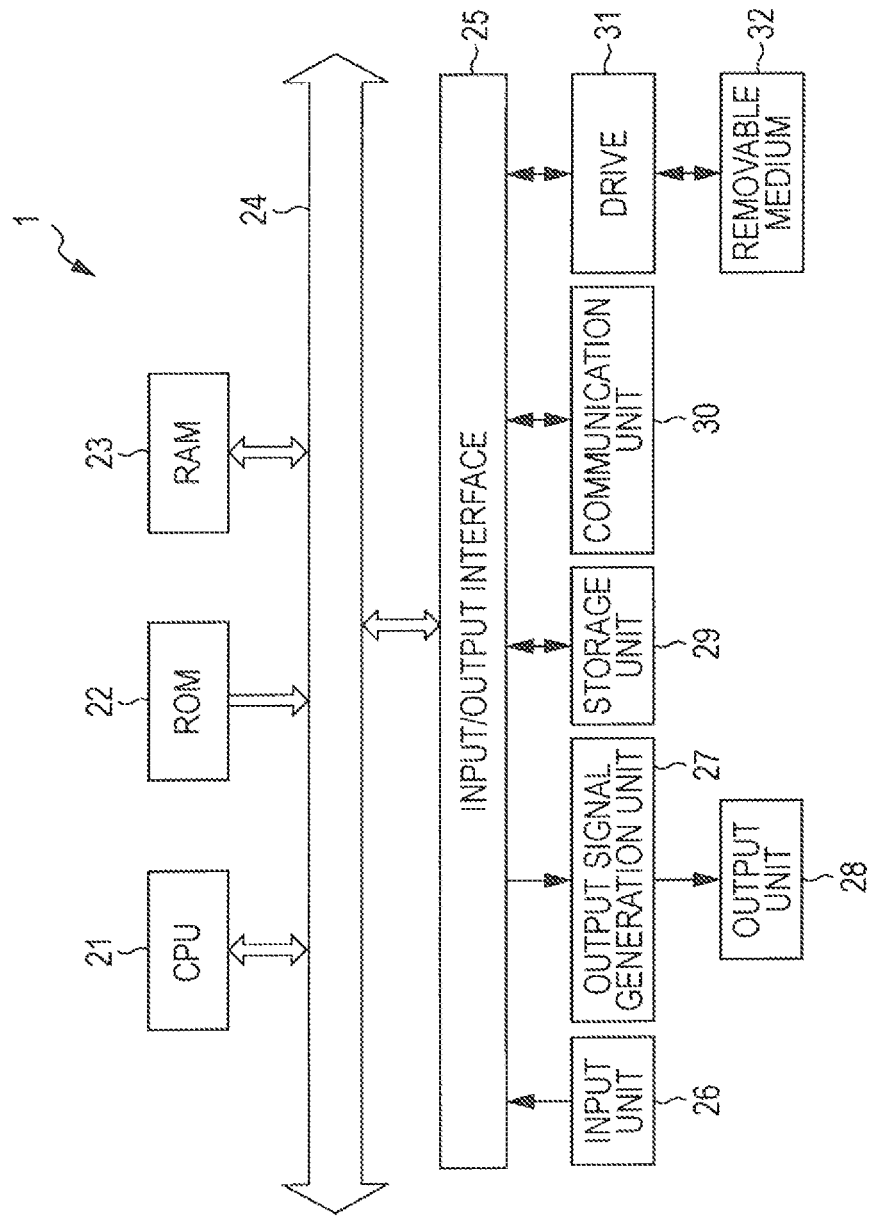
FIG. 1 is a block diagram showing a hardware configuration example of an embodiment of an editing device to which the present disclosure is applied.

FIG. 1 is a block diagram showing a hardware configuration example of an embodiment of an editing device to which the present disclosure is applied.

In FIG. 1, a Central Processing Unit 21 (CPU) performs a variety of processes in accordance with a program that is recorded in a Read Only Memory 22 (ROM). Alternatively, the CPU 21 performs the variety of processes in accordance with a program that is loaded from a storage unit 29 to a Random Access Memory 23 (RAM). Data is appropriately stored in the RAM 23 when the CPU 21 performs the variety of processes.

For example, in the present embodiment, a program that performs a variety of functions of an editing control unit 71 and writing/reading processing unit 72 of FIG. 2, described later, is stored in the ROM 22 and the storage unit 29. Accordingly, the CPU 21 performs a process in accordance with the program to thereby realize the variety of functions of the editing control unit 71 and writing/reading processing unit 72.

The CPU 21, the ROM 22, and the RAM 23 are connected to each other via a bus 24. An input/output interface 25 is also connected to the bus 24.

An input unit 26, an output signal generation unit 27, a storage unit 29, and a communication unit 30 are connected to the input/output interface 25.

The input unit 26 includes, for example, a keyboard, a mouse, and the like, and inputs a variety of information to an editing device 1. For example, the input unit 26 receives a variety of instructions by an input operation from an editor.

The output signal generation unit 27 generates an output signal output to the outside of the editing device 1, and supplies the generated output signal to the output unit 28. The output unit 28 includes a display, a speaker, and the like, and outputs a moving image or audio corresponding to the supplied output signal.

The storage unit 29 includes, for example, a hard disk, and the like, and stores a variety of information. For example, throughout the time before and after editing, content data to be edited is stored in the storage unit 29.

The communication unit 30 includes, for example, a modem, a terminal adapter, and the like, and controls communication performed between another device and another device (not shown) via a network, including the Internet.

A drive 31 is connected to the input/output interface 25, as necessary, and a removable medium 32 including a magnetic disk, an optical disc, a magneto-optical disc, a semiconductor memory, or the like is appropriately mounted to the input/output interface 25. Also, a computer program that is read from these is installed in the storage unit 29, as necessary.

Further, in the present embodiment, the clip is adopted as the unit of the process. The clip according to the present embodiment refers to a moving image obtained as a result of photography between an instruction to start photography (hereinafter, referred to as a start point) to an instruction to end photography (hereinafter, referred to as an end point), and also includes, as necessary, audio that is recorded together with the corresponding moving image. Accordingly, hereinafter, moving image data from the start point to the end point, audio data from the start point to the end point, and attached information of corresponding moving data and corresponding audio data are collectively referred to as clip data.

In the present embodiment, a single content item is constituted by a plurality of clips which are connected to each other. Here, the connection also includes a case in which the clip data is separately stored, and two corresponding pieces of the clip data are associated with data of a play list performing an instruction for continuously reproduce two corresponding clips, as well as a case in which the clip data is treated as a single piece of batch data by directly connecting the clip data. In any case, in the present embodiment, the editing of the content is performed in clip units.

[Functional Configuration Example of Editing Device]

Figure 2:
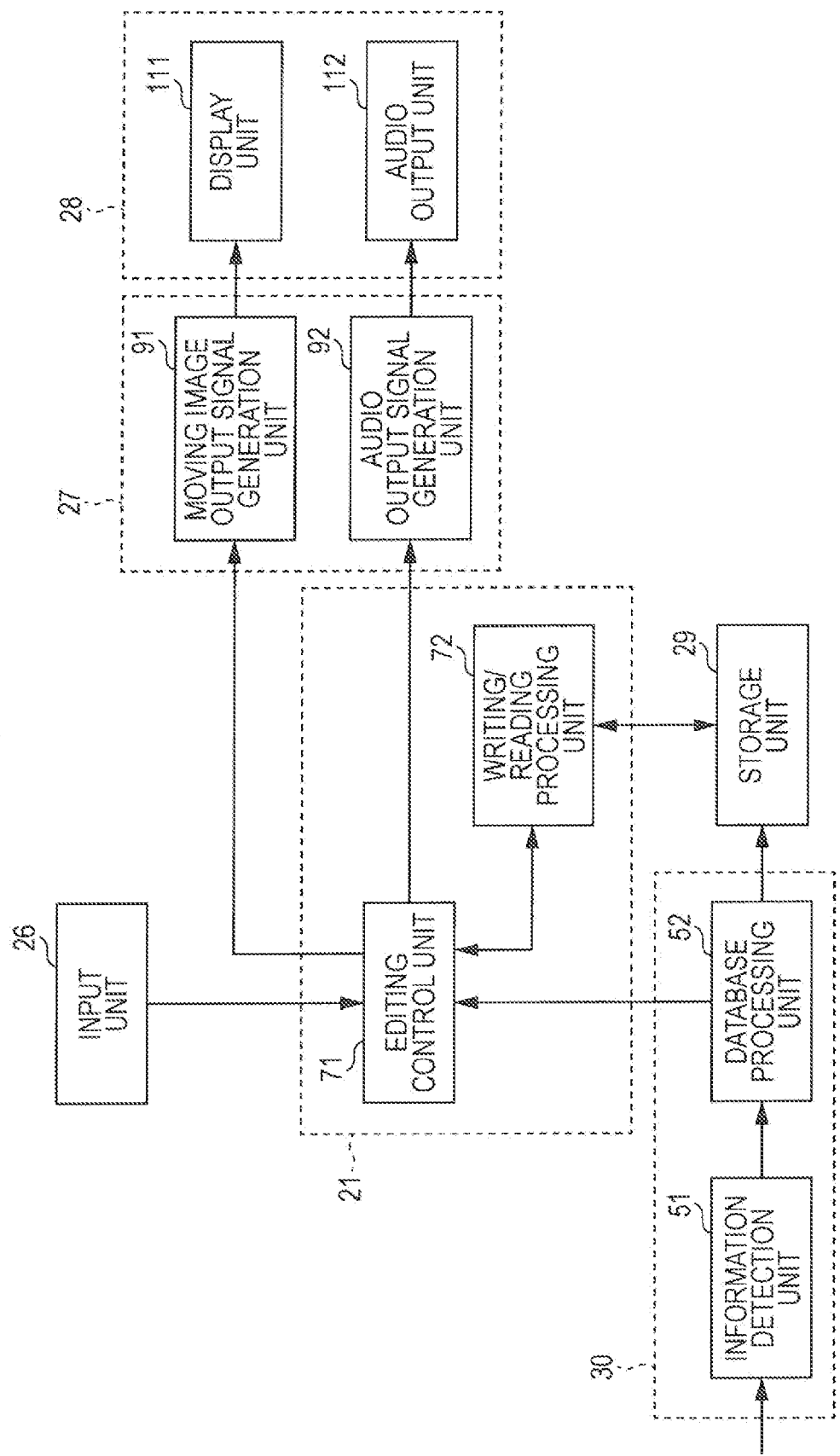
FIG. 2 is a block diagram showing a functional configuration example for realizing a variety of functions relating to editing of content.

FIG. 2 is a block diagram showing a functional configuration example for realizing a variety of functions relating to the editing of the content from among the functions of the editing device 1 of FIG. 1.

That is, in order to realize the variety of functions relating to the editing of the content, the CPU 21, each of the input unit 26, the output signal generation unit 27, the output unit 28, the storage unit 29, and the communication unit 30 has the following functional configuration.

That is, the CPU 21 includes the editing control unit 71 and the writing/reading processing unit 72. The output signal generation unit 27 includes an image output signal generation unit 91 and a sound output signal generation unit 92. The output unit 28 includes a display unit 111 and a sound output unit 112. The communication unit 30 includes an information detection unit 51 and a database processing unit 52.

The information detection unit 51 obtains the clip data output from an external photographing device which is not shown, and detects attached information from corresponding clip data. In the present embodiment, the attached information is Lime information indicating the time of each start point and end point of the clip. The information detection unit 51 supplies the detected attached information, the moving image data included in the clip, and the audio data to the database processing unit 52.

The database processing unit 52 associates each of the attached information, the moving image data, and the audio data with each other, stores the associated information in a database, and stores the database obtained as the result in the storage unit 29. In addition, the database processing unit 52 generates database information capable of confirming the content of the clip based on the attached information, the moving image data, and the audio data, and supplies the generated information to the editing control unit 71. As the database information, it is sufficient if the information is capable of identifying the content of the clip, and the database information includes information such as a thumbnail, the length of the clip, the set frame rate of the moving image data, the storage location in the storage unit 29, and the like.

The editing control unit 71 performs a variety of controls relating to editing of data of the content in accordance with content of an instruction operation of the input unit 26 by the editor, or the database information supplied from the database processing unit 52.

For example, the editing control unit 71 controls the writing/reading processing unit 72 to thereby write, in the storage unit 29, content data created by connecting a plurality pieces of clip data.

In addition, for example, the editing control unit 71 controls the writing/reading processing unit 72 to thereby read content data stored in the storage unit 29. The editing unit 71 edits the read data of the content in clip units in accordance with a variety of instructions. Next, the editing control unit 71 controls the writing/reading processing unit 72 to thereby write content data after the editing in the storage unit 29.

In addition, for example, the editing control unit 71 controls the moving image output signal generation unit 91 and the sound output signal generation unit 92 to thereby control the reproduction of content during or after editing.

Specifically, for example, the editing control unit 71 controls display of the moving image with respect to the content during or after the editing, and supplies corresponding moving image data to the moving image output signal generation unit 93. The moving image output signal generation unit 91 generates a moving image signal conforming to the format of the display unit 111 as an output signal based on the supplied moving image data, and supplies the generated signal to the display unit 111. The display unit ill displays a moving image corresponding to the supplied moving image signal, that is, a moving image concerning the content during or after the editing.

In addition, for example, the editing control unit 71 controls an output of a sound for the content during or after the editing, and supplies corresponding audio data to the sound output signal generation unit 92. The sound output signal generation unit 92 generates the sound signal conforming to the format of the sound output unit 112 as an output signal based on the supplied audio data, and the generated signal to the sound output unit 112. The sound output unit 112 outputs a sound corresponding to the supplied sound signal, that is, a sound concerning the content during or after the editing.

The reproduction of the content during or after the editing which is performed by the control of the editing control unit 71 is briefly classified into a first reproduction and a second reproduction as follows:

The first reproduction refers to a partial reproduction of content which is performed in order for an editor to confirm an edited part (that is, also including a part shorter than the clip) of the content during which the data of the content is partially edited in the clip unit or after partial editing. The first reproduction is referred to as a reproduction for partial editing confirmation. In addition, confirmation performed by the editor at the time of the reproduction for partial editing confirmation will be hereinafter referred to as partial editing confirmation.

Meanwhile, the second reproduction refers to reproduction of the entire content which is performed in order for the editor to confirm all of the content after the editing when all of the editing operations are completed. The second reproduction will be hereinafter referred to as reproduction for final editing confirmation. In addition, as a control of the reproduction for final editing conformation, the editing control unit 71 performs a control of reproducing by attaching a different mark to the moving image for each type of clip that is classified in accordance with the total count of reproductions for partial editing confirmation. In this manner, a series of control processes performed by the editing control unit 71 for performing the reproduction for final editing confirmation will be hereinafter referred to as a reproduction process for confirmation. The reproduction process for confirmation will be described later in detail with reference to FIG. 4.

[Functional Configuration Example of Editing Control Unit]

Figure 3:
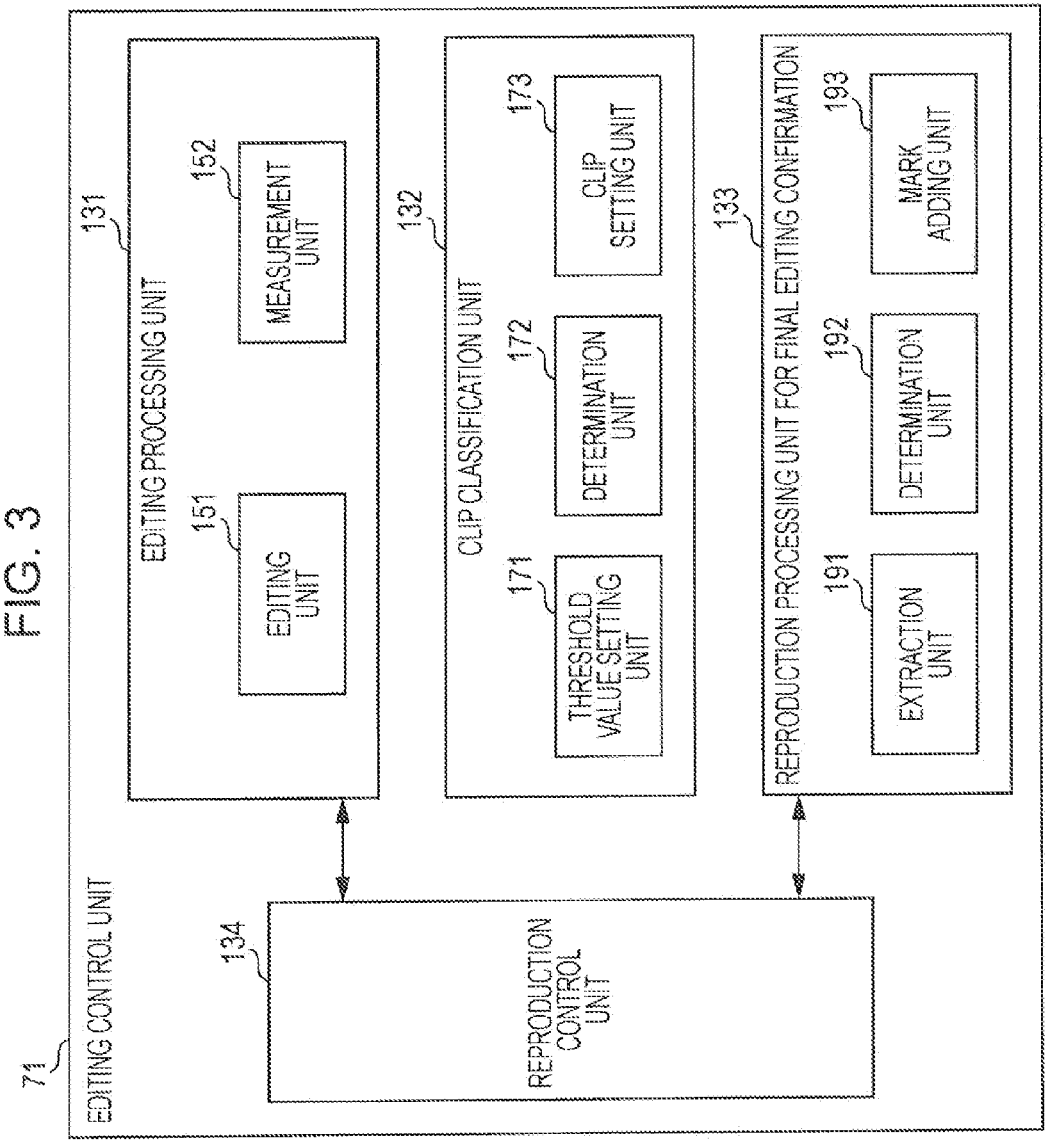
FIG. 3 is a block diagram showing a detailed functional configuration example of an editing control unit.

FIG. 3 is a block diagram showing a detailed functional configuration example of the editing control unit 71 of FIG. 2.

The editing control unit 71 includes an editing processing unit 131, a clip classification unit 132, a reproduction processing unit for final editing confirmation 133, and a reproduction control unit 134.

The editing processing unit 131 includes an editing unit 151 and a measurement unit 152.

The editing unit 151 partially edits content data in clip units. For example, the editing unit 151 edits corresponding clip data by performing an image process that gives visual effects such as adjustment of color or brightness, insertion of a Computer Graphics (CC) image, and the like, which are performed with respect to moving image data included in clip data to be edited.

The measurement unit 152 measures the total count of, reproductions for partial editing confirmation by incrementing the number of reproductions by 1 each time the reproduction for partial editing confirmation is performed by a control of the reproduction control unit 134 which will be described later. Further, the measurement of the total count by the measurement unit 152 will be described later in detail with reference to FIGS. 6A to 7.

In this manner, a series of processes which are performed by the editing processing unit 131 including the editing unit 151 and the measurement unit 152 are referred to as an editing process, and will be described later with reference to FIG. 5.

The clip classification unit 132 classifies each clip constituting the content to be edited into a first to third type in accordance with the total count of reproductions for partial editing confirmation, and includes a threshold value setting unit 171, a determination unit 172, and a clip setting unit 173.

The first type of clip refers to clips in which the total count of reproductions for partial editing confirmation is low, for example, clips for which the total count is equal to or lower than a first threshold value. That is, since the total count of reproductions for partial editing confirmation is low, that is, since the number of confirmations by the editor is small, the first type of clip refers to clips on which it is necessary for the editor to perform a final editing confirmation with concentration. Thus, the first type of clip will be hereinafter referred to as a "clip for attention".

The second type of clip refers to clips for which the total count of reproductions for partial editing confirmation is large, for example, clips for which the total count is equal to or greater than a second threshold value. Further, it is assumed that a relationship in which the second threshold value is larger than the first threshold value is satisfied. That is, since the total count of reproductions for partial editing confirmation is large, that is, since the number of confirmations by the editor is large, the second type of clip refers to clips for which final editing confirmation is capable of being performed to some extent in an easy manner. Thus, the second type of clip will be hereinafter referred to as an "easy clip".

The third type of clip refers to clips which are not classified as a clip for attention or an easy clip, for example, clips satisfying a relationship in which the total count of reproductions for partial editing confirmation is smaller than the second threshold value, and larger than the first threshold value. That is, the third type of clip for which the final editing confirmation is capable of being performed with ordinary attention. Thus, the third type of clip will be hereinafter referred to as an "ordinary clip".

The threshold value setting unit 171 sets the above described first and second threshold values.

The determination unit 172 determines the total count of reproductions for partial editing confirmation with respect to the clip to be processed, and the level of the first and second threshold values which are set by the threshold setting unit 171.

The clip setting unit 173 sets the clip to be processed to any of the easy clip, the clip for attention, and the ordinary clip based on the determination result of the determination unit 172. That is, in a case in which the total count of reproductions for partial editing confirmation is the second threshold value or more, the clip to be processed is set as an easy clip. Meanwhile, when the total count of reproductions for partial editing confirmation is the first threshold or more, the clip to be processed is set as a clip for attention. In addition, when the total count of reproductions for partial editing confirmation is smaller than the second threshold value, and larger than the first threshold value, the clip to be processed is set as an "ordinary clip".

In this manner, a series of processes performed by the clip classification unit 132 including the threshold setting unit 171, the determination unit 172, and the clip setting unit 173 is referred to as a clip classification process, which will be described later with reference to FIG. 8.

A reproduction processing unit 133 for final editing confirmation displays a moving image by attaching a different mark to each type of clip, and includes an extraction unit 191, a determination unit 192, and a mark adding unit 193.

The extraction unit 191 extracts clip data to be reproduced from content data.

The determination unit 192 determines the type of clip data extracted as a target to be reproduced by the extraction unit 191. That is, whether the clip data to be reproduced is any type of data from among the easy clip, the clip for attention, and the ordinary clip is determined by the determination unit 192.

The mark adding unit 193 processes the clip data to be reproduced such that a mark associated with the type determined by the determination unit 192 is added to the moving image within the clip to be reproduced. In the present embodiment, an outer frame is used as the mark.

A series of processes performed by the reproduction processing unit 133 for final editing confirmation, which has the extraction unit 191, the determination unit 192, the mark adding unit 193, is referred to as a reproduction process for final editing confirmation, and will be described later with reference to FIG. 9.

When a part of the content data is edited in the clip unit by the editing processing unit 131, the reproduction control unit 134 performs a reproduction for partial editing confirmation, that is, performs a control for reproducing only the edited part of the content. In addition, the reproduction control unit 134 performs a reproduction for final editing confirmation, that is, performs a control for reproducing all of the content after editing when the editing process is completed by the editing processing unit 131. In this case, a moving image of the content after the editing is reproduced such that a different mark is added to each type of clip by the mark adding unit 193.

Next, a reproduction process for confirmation performed by the editing control unit 71 including the editing processing unit 131, the clip classification unit 132, the reproduction processing unit 133 for final editing confirmation, and the reproduction control unit 134 will be described.

Figure 4:
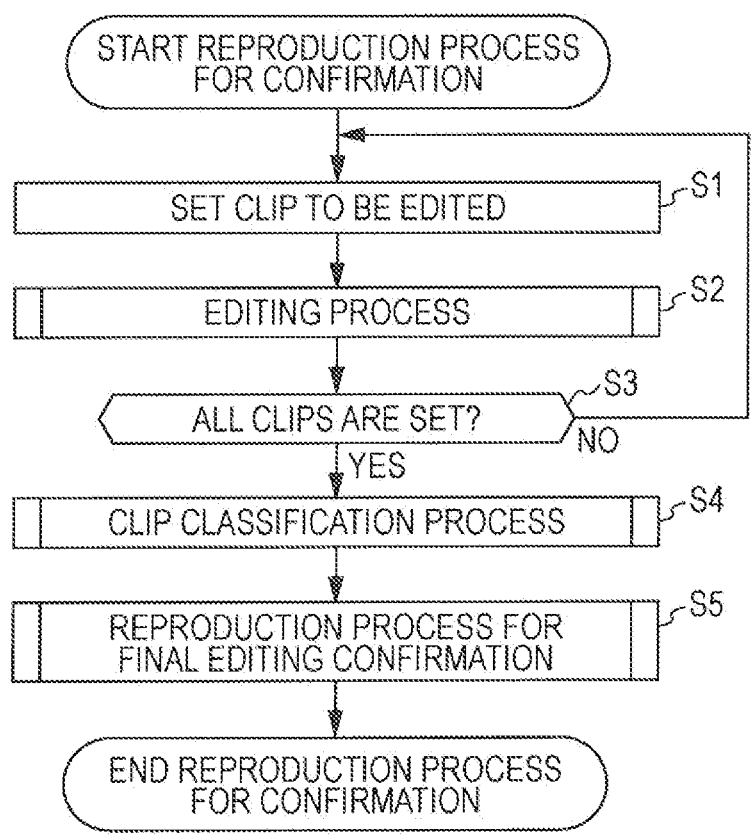
FIG. 4 is a flowchart for describing a reproduction process for confirmation.

[Reproduction Process for Confirmation]
FIG. 4 is a flowchart for describing the reproduction process for confirmation performed by the editing control unit 71.

In step S1, the editing control unit 71 sets a clip to be edited. In this case, the clip set as a target to be edited may be a clip that is incorporated into predetermined content, or may be a single clip before being incorporated into the content.

In step S2, the editing processing unit 131 performs an editing process. That is, the editing processing unit 131 performs the editing process of partially editing content data in clip units, and measuring a total count of a reproduction of partial editing confirmation.

Hereinafter, a detailed example of the editing process will be described.

Figure 5:
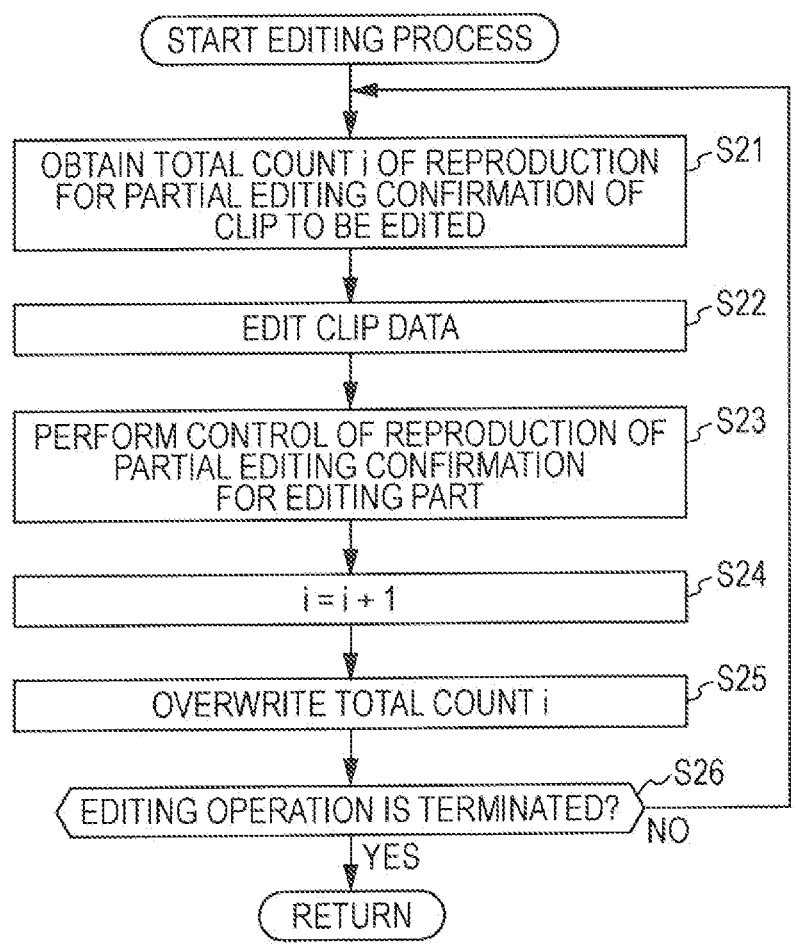
FIG. 5 is a flowchart for describing an editing process.

[Editing Process]
FIG. 5 is a flowchart for describing the editing process performed by the editing processing unit 131.

In step S21, the measurement unit 152 of the editing processing unit 131 obtains a total count i of the reproduction for partial editing confirmation of the clip to be edited.

Here, the total count i will be described with reference to FIGS. 6A to 7.

Figure 6A:
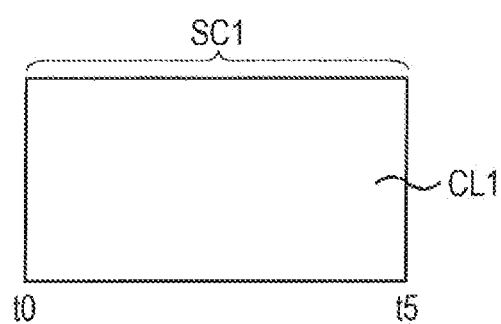
FIGS. 6A and 6B are diagrams for describing editing of a clip to be edited.
Figure 6B:
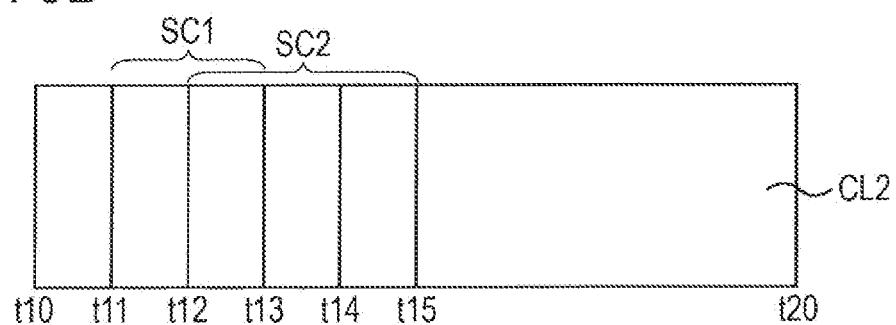

[Editing of Clip]
FIGS. 6A and 6B are diagrams for describing editing of a clip to be edited.

FIG. 6A shows a clip CL1. In FIG. 6A, the horizontal axis signifies the time axis. As for the clip CL1, the start point is a time t0, and the end point is a time t5.

Here, the time period from the start point of the clip to the end point of the clip is referred to as a photographing time period. The editing unit 151 is able to extract moving image data (also audio data, as necessary) from an arbitrary first time of the photographing time period to an arbitrary second time. That is, the editing unit 151 is able to treat a part of the clip data as an editing target. That is, the editor sets the first time as an editing start point, and sets the second time as an editing end point by operating the input unit 26, so that moving image data of a desired time period from the clip data is used as the target to be edited as scene data. In other words, the scene data is able to be regarded as a kind of clip data cropped from original clip data. Further, in a case in which the editing start point and the editing end point are not set by the editor, the start and end points of the clip are set as is by the editing unit 151 as the editing start point and the editing end point, so that the entire clip data, that is, moving image data of the entire photographing time period becomes the target to be edited, acting as the scene data.

In FIG. 6A, since the editing start point and the editing end point within the photographing time period of the clip CL1 are set by the editor, a time t0 of the start point of the clip CL1 is set as the editing start point, and a time t5 of the end point of the clip CL1 is set as the editing end point by the editing unit 151. Accordingly, the entire data of the clip CL1, that is, the moving image data of the entire photographing time period of the time t0 to the time t5 becomes the target to be edited as the scene data SC1.

In FIG. 6B, an editing start point and an editing end point within a photographing time period of a clip CL2 are set by the editor. That is, a time t11 is set as the editing start point, and a time t13 is set as the editing end point by the editing unit 151. Accordingly, moving image data of the photographing time period of the time t11 to the time t13 becomes a target to be edited as scene data SC1. En addition, a time t12 is set as the editing start point, and a time t15 is set as the editing end point by the editing unit 151. Accordingly, the moving image data of the photographing time period of the time t12 to the time t15 becomes the target to be edited as scene data SC2.

When editing is performed with respect to the scene data of the clip data to be edited, the measurement unit 152 updates an editing table shown in FIG. 7.

[Example of Editing Table]
FIG. 7 is a diagram showing an example of an editing table.

In an example of FIG. 7, the editing table has a matrix structure. Hereinafter, a horizontal direction as a row direction, and a vertical direction as a column direction will be described.

One predetermined line of the editing table corresponds to a predetermined clip of a plurality of original clips before the editing. In the row direction of the editing table, items such as "clip number", "scene number", "editing start point", "editing end point", "number of reproductions", and "total count of reproductions" are provided.

In the item of the "clip number" of a predetermined row, the number for uniquely identifying the original clip corresponding to the predetermined row is stored. In the "scene number", a number for uniquely identifying scene data concerning the original clip corresponding to the predetermined row is stored. The time of the editing start point of the scene data is stored in the "editing start point", and the time of the editing end point of the scene data is stored in the "editing end point". In the "number of reproductions", the number k (hereinafter, referred to as the number of reproductions of scene data) of reproductions for partial editing confirmation concerning the scene data is stored. In the "total count of reproductions", the total count i of reproduction for partial editing conformation concerning the original clip corresponding to the predetermined row is stored. There is a case in which a plurality pieces of scene data is included in a single piece of the clip data. Accordingly, in this case, the number obtained by totaling all of the number of reproductions k of each of the plurality pieces of scene data is stored in the "total count of reproductions". Accordingly, when the number of reproductions k of the scene data is updated, the total count i is accordingly updated.

For example, when the first row of the table of FIG. 7 is noted, scene data of the scene number "SC1" is included in the clip data of the clip number "CL1". That is, a clip corresponding to the first row of the table of FIG. 7 corresponds to the clip CL1 shown in FIG. 6A. The scene data SC1 is moving image data of a time period from the editing start point "t0" to the editing end point "t5", and the number of reproductions k of the scene data is "3". In the clip CL1, since only a single piece of the scene data of the scene number "SC1" is a target to be edited, "3" which is the number of reproductions k of the scene data is the total count i of the reproduction for partial editing confirmation of all of the clips CL1 as is.

For example, when the second and third rows of the table of FIG. 7 is noted, scene data of the scene numbers "SC1" and "SC2" is included in clip data of the clip number "CL2". That is, clips corresponding to the second and third rows of the table of FIG. 7 correspond to the clip CL2 shown in FIG. 6B. The scene data "SC1" is moving image data of a time period from the editing start point "t11" to the editing end point "t13", and the number of reproductions k of the scene data is "5". The scene data "SC2" is moving image data of a time period from the editing start point "t12" to the editing end point "t15", and the number of reproductions k of the scene data is "2". In the clip CL2, since two pieces of scene data of the scene numbers "SC1" and "SC2" are targets to be edited, "7" obtained by totaling "5" and "2" each being the number of reproductions k of the scene data is the total count i of the reproduction for partial editing confirmation of all of the clips CL2.

Referring again to the flowchart of FIG. 5, in step S21, the measurement unit 152 obtains a value stored in the item of the "total count of reproductions" of a row corresponding to the clip to be edited, as the total count i of the reproduction for partial editing confirmation with reference to the above described editing table of FIG. 7.

In step S22, the editing unit 151 edits the clip data. That is, the editing unit 151 edits the clip data to be edited by performing visual effects such as adjustment of color or brightness, CG image insertion, and the like with respect to the scene data of the clip data to be edited. Hereinafter, a case in which editing is performed with respect to the scene data SC1 of the clip CL2 of FIG. 6B will be described.

In step S23, the reproduction control unit 134 performs a control of reproduction for partial editing confirmation concerning the edited part. For example, in the present embodiment, the scene data SC1 of the clip CL2 of FIG. 6B which is edited in the process of step S22 is reproduced.

In step S24, the measurement unit 152 increments, by 1, the total count i of the reproduction for partial editing confirmation concerning the clip to be edited (i=i+1). In this instance, the number of reproductions k of the scene data to be edited is incremented by 1 (k=k+1). For example, the measurement unit 152 increments, by 1, the number of reproductions k of the scene data SC1 of the clip CL2 of FIG. 6B which is reproduced in a process of step S23. As a result, the measurement unit 152 also increments the total count i by 1.

In step S25, the measurement unit 152 writes the total count i after being incremented in a process of step S25, in the item of the "total count of reproductions" of a row corresponding to the clip to be edited from the editing table of FIG. 7. That is, a stored value of the item of the "total count of reproductions" of a column corresponding to the clip to be edited is updated so that the value is incremented by 1.

In step S26, the editing unit 151 determines whether the editing operation is completed.

In a case when the editing operation is not completed, NO is determined in step S26, the corresponding processing is returned to step S21, and the subsequent processing is repeated. That is, loop processing of step S21 to step S26 is repeated until the editing operation is completed, the reproduction for partial editing confirmation concerning the clip to be edited is performed, so that the total count i is incremented. For example, in this case, the loop processing of step S21 to step S26 is repeated until the editing operation of each of the scene data SC1 and SC2 of the clip CL2 of FIG. 6B is completed.

Thereafter, when the editing operation is completed, Yes is determined in step S26, and the editing process is completed. That is, the editing process of the step S2 of FIG. 4 is completed, and the corresponding processing proceeds to step S3.

In step S3, the editing control unit 71 determines whether all of the clips are set as a target to be edited.

In addition, when all of the clips are not set, it is determined to be NO in step S3, the corresponding processing is returned to step S1, and the subsequent processing is repeated. That is, loop processing of step S1 to step S3 is repeated until all of the clips are set as the target to be edited, so that content data is partially edited in clip units, and the total count of reproductions for partial editing confirmation is measured.

Thereafter, in a case in which all of the clips are set as the target to be edited, YES is determined in step S3, and the corresponding processing proceeds to step S4.

In step S4, the clip classification unit 132 performs a clip classification process. That is, the clip classification unit 132 determines the number of reproductions of partial editing confirmation concerning the clip to be processed and the level of the first threshold value and the second threshold value, and classifies the clip to be processed into any one of the easy clip, the clip for attention, and the ordinary clip.

Hereinafter, the clip classification process will be described in detail.

[Clip Classification Process]

Figure 8:
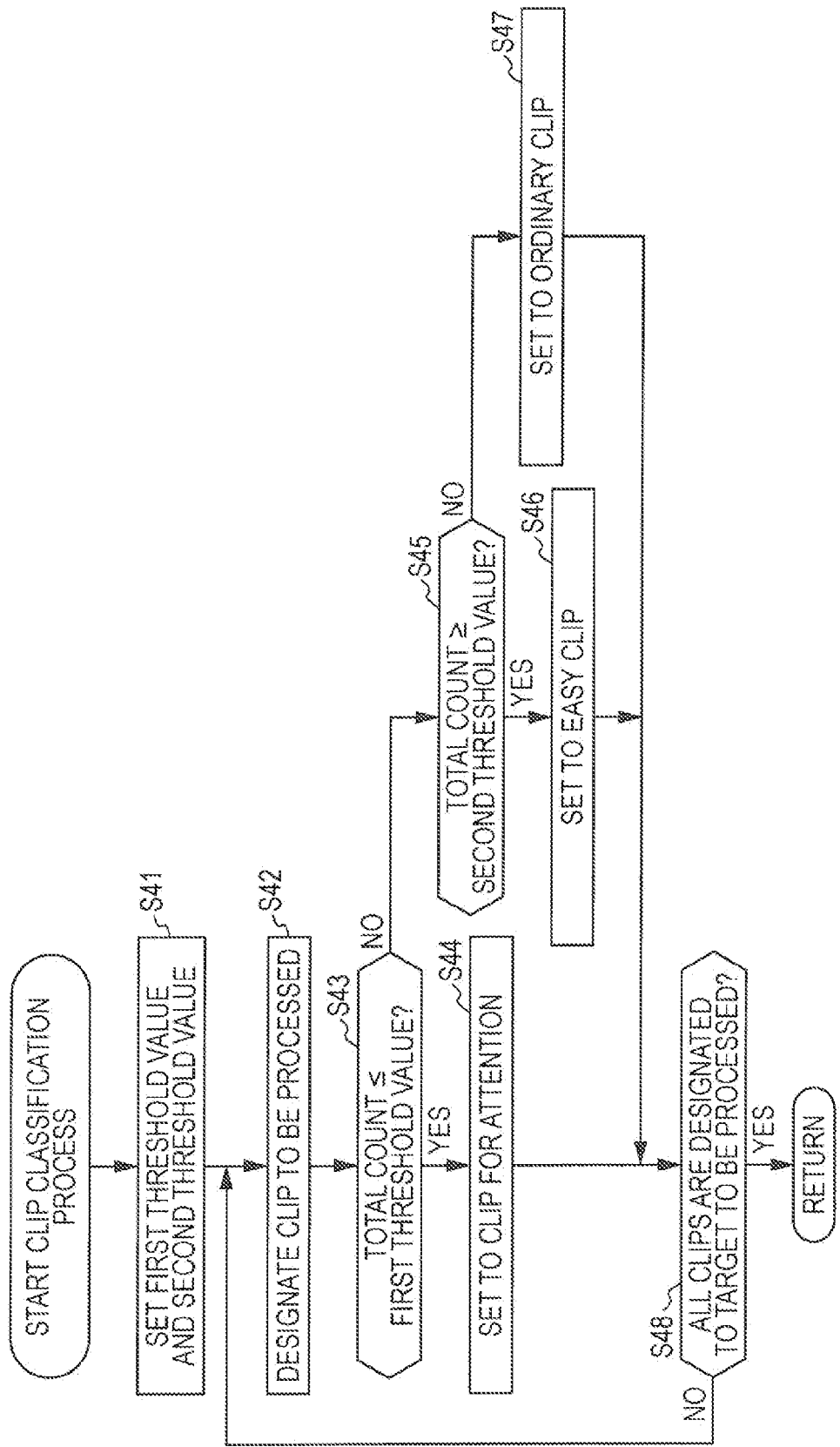
FIG. 8 is a flowchart for describing the flow of a clip classification process.

FIG. 8 is a flowchart for describing a clip classification process performed by the clip classification unit 132.

In step S41, the threshold value setting unit 171 of the clip classification unit 132 sets the first threshold value and the second threshold value based on an input operation from an editor to the input unit 26. As described above, the first threshold value is a threshold value for dividing clips for attention from other clips, and specifically, is used in a process of step S43, which will be described later. The second threshold value is a threshold value for dividing the easy clips from other clips, and specifically, is used in a process of step S45, which will be described later.

In step S42, the determination unit 172 designates the clip to be processed from the content to be edited.

In step S43, the determination unit 172 determines whether the total count of reproductions for partial editing confirmation is equal to or lower than the first threshold.

When the total count of reproductions for partial editing confirmation is equal to or lower than the first threshold, Yes is determined in step S43, and the corresponding processing proceeds to step S44.

In step S44, the clip setting unit 173 sets the clip to be processed to the clip for attention. In step S44, when the clip to be processed is set as a clip for attention, the corresponding processing proceeds to step S48. The subsequent processing of step S48 will be described later.

On the other hand, when the total count of reproductions for partial editing confirmation is larger than the first threshold value, No is determined in step S43, and the corresponding processing proceeds to step S45.

In step S45, the determination unit 172 determines whether the total count of reproductions for partial editing confirmation is the second threshold value or more.

When the total count of reproductions for partial editing confirmation is the second threshold value or more, Yes is determined in step S45, and the corresponding processing proceeds to step S46.

In step S46, the clip setting unit 173 sets the clip to be processed to the easy clip. In step S46, when the clip to be processed is set as an easy clip, the corresponding processing proceeds to step S48. The subsequent processing of step S48 will be described later.

On the other hand, when the total count of reproductions for partial editing confirmation is smaller than the second threshold value, No is determined in step S45, and the corresponding processing proceeds to step S47.

In step S47, the clip setting unit 173 sets the clip to be processed to the ordinary clip. That is, when the total count of reproductions of partial editing conformation of the clip to be processed is larger than the first threshold value and smaller than the second threshold value, the clip setting unit 173 sets the clip to be processed to the ordinary clip. In step S47, when the clip to be processed is set as an ordinary clip, the corresponding processing proceeds to step 48.

In step S48, the determination unit 172 determines whether all of the clips are designated as a target to be processed.

When all of the clips are not designated as a target to be processed, No is determined in step S48, the corresponding processing returns to step S42, and the subsequent processing is repeated. That is, loop processing of step S42 to step S48 is repeated until all of the clips are designated as a target to be processed, so that the clip to be processed is classified into any one of the easy clip, the clip for attention, and the ordinary clip.

Thereafter, when all of the clips are designated as a target to be processed, Yes is determined in step S48, and the clip classification process is completed. That is, the process of step S4 of FIG. 4 is completed, and the corresponding processing proceeds to step S5.

In step S5, the reproduction processing unit 133 for final editing confirmation performs a reproduction process for final editing confirmation. That is, the reproduction processing unit 133 for final editing confirmation adds a different mark to each type of clip at the time of the reproduction for final editing confirmation to thereby display a moving image.

Hereinafter, the reproduction process for final editing confirmation will be described in detail.

[Reproduction Process for Final Editing Confirmation]

Figure 9:
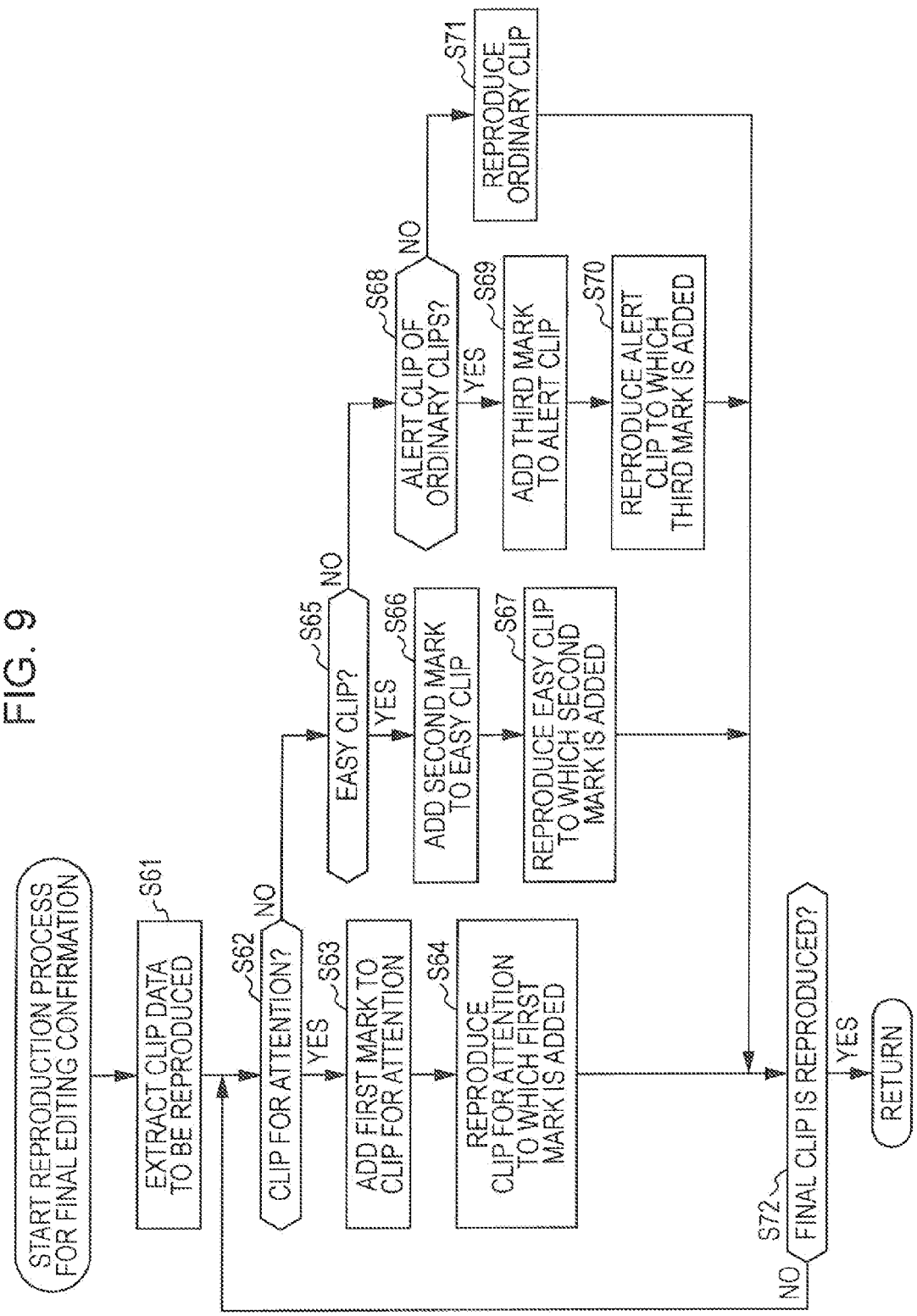
FIG. 9 is a flowchart for describing the flow of a reproduction process for final editing confirmation.

FIG. 9 is a flowchart for describing a reproduction process for final editing confirmation performed by the reproduction processing unit 133 for final editing confirmation.

In step S61, the extraction unit 191 of the reproduction processing unit 133 for final editing confirmation extracts clip data to be reproduced from content data.

In step S62, the determination unit 192 determines whether the clip data to be reproduced is the clip for attention.

When the clip data to be reproduced is the clip for attention, Yes is determined in step S62, and the corresponding processing proceeds to step S63.

In step S63, the mark adding unit 193 adds first mark data to clip data of the clip for attention. Here, since it is necessary for the editor to perform a confirmation operation with respect to the clip for attention while concentrating during the final editing confirmation, as the first mark added to the clip for attention, a mark (an outer frame in the present embodiment) with a conspicuous color such as red, and the like is used as the first mark added to the clip for attention.

In step S64, the reproduction control unit 134 performs a control for reproducing the clip data of the clip for attention to which the first mark is added. When the clip data of the clip for attention to which the first mark data is added, the corresponding processing proceeds to step S72. The subsequent processing of step S72 will be described later.

On the other hand, when the clip data to be reproduced is not the clip for attention, No is determined in step S62, and the corresponding processing proceeds to step S65.

In step S65, the determination unit 192 determines whether the clip data to be reproduced is the easy clip.

When the clip data to be reproduced is the easy clip, Yes is determined in step S65, and the corresponding processing proceeds to step S66.

In step S66, the mark adding unit 193 adds second mark data to clip data of the easy clip. Here, since it is possible to perform the confirmation operation with respect to the easy clip in an easy manner to some extent during the final editing confirmation, a mark (an outer frame in the present embodiment) with an inconspicuous color such as green, and the like is used as the second mark added to the easy clip.

In step S67, the reproduction control unit 134 performs a control for reproducing clip data of the easy clip to which the second mark data is added. When the clip data of the easy clip to which the second mark data is added is reproduced, the corresponding processing proceeds to step S72. The subsequent processing of step S72 will be described later.

On the other hand, when the clip data to be reproduced is not an easy clip, that is, when the clip data is an ordinary clip, No is determined in step S65, and the corresponding processing proceeds to step S68.

In step S68, the determination unit 192 determines whether the clip data to be reproduced is an alert clip from the ordinary clip. The alert clip is a clip that alerts the editor to the fact that the reproduction of the clip for attention is approaching, and refers to the fact that at least one clip for attention is included in each of the 1 to m clips ahead from among the ordinary clips. Further, the alert clip will be described later with reference to FIG. 10.

When the clip data to be reproduced is an alert clip from the ordinary clips, Yes is determined in step S68, and the corresponding processing proceeds to step S69.

In step S69, the mark adding unit 193 adds third mark data to the clip data of the alert clip. For example, when the clip for attention is suddenly reproduced in a state in which the ordinary clip is reproduced at the time of the final editing confirmation, it is necessary for the editor to switch from a state in which the confirmation operation is performed with ordinary attention to a state in which the confirmation operation is suddenly performed with concentration. In this case, it is necessary for the editor to rapidly switch concentration. Here, when concentration is not successively switched, there is a risk that the editor may finally determine that the edited content has no problem without being aware of incompleteness in the editing even though the editing of the data of the content is incomplete. Accordingly, in order to alert the editor, a mark (an outer frame in the present embodiment) with a more conspicuous color than that of the first mark, such as yellow, and the like is used as the third mark added to the alert clip.

In step S70, the reproduction control unit 134 performs a control for reproducing the clip data of the alert clip to which the third mark data is added. When the clip data of the alert clip to which the third mark data is added is reproduced, the corresponding processing proceeds to step S72. The subsequent process of step S72 will be described later.

On the other hand, when the clip data to be reproduced is not an alert clip from ordinary clips, No is determined in step S68, and the corresponding processing proceeds to step S71.

In step S71, the reproduction control unit 134 performs a control for reproducing the ordinary clip.

Here, at the time of the final editing confirmation, a state in which the clips to which the first to third marks are added are reproduced will be specifically described.

[Specific Example of Reproduction for Final Editing Confirmation]

Figure 10:
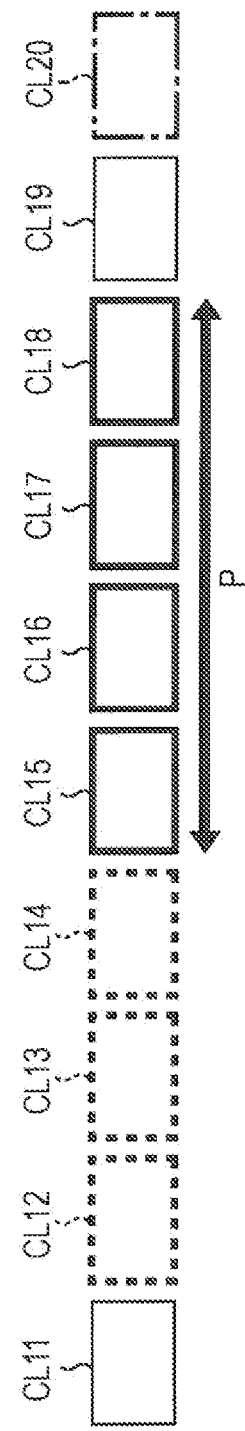
FIG. 10 is a diagram for describing a specific example of reproduction for final editing confirmation.

FIG. 10 is a diagram for describing a specific example of reproduction for final editing confirmation.

In FIG. 10, clips CL11 to CL20 among clips constituting content are shown. The clips C11 to CL20 are continuously reproduced in the stated order.

The clips CL11 to CL14 are ordinary clips.

Here, a third outer frame as the third mark is added to an outer frame of the alert clip within the ordinary clips, and no frame is added to ordinary clips other than the alert clips.

Here, the alert clip is a clip that is to be reproduced henceforth from among the ordinary clips, that is, a clip that is reproduced temporally after the noted clip, and refers to the fact that at least one of the concentration clips is included in each of m clips ahead. The value of m is an arbitrary integer greater than 1. In an example of FIG. 10, m=3 is satisfied.

For example, when the clip CL11 which is the ordinary clip is rioted, clips of m (=3) clips ahead to be reproduced henceforth are clips CL12 to CL14. All of the clips CL12 to CL14 are the ordinary clips, and do not include a clip for attention. Accordingly, since the clip CL11 which is the ordinary clip is not an alert clip, a third outer frame is not added to the clip CL11.

On the other hand, when the clip CL12 which is the ordinary clip is noted, clips of m (=3) clips ahead to be reproduced henceforth are the clips CL13 to CL15. The clips CL13 and CL14 are ordinary clips; however, the clip CL15 is a clip for attention. Accordingly, since the clip CL12, which is an ordinary clip, is n alert clip, a third outer frame is added to the clip CL12. Similarly, since the clips CL13 and CL14 are also alert clips, a third outer frame is added to the clips CL13 and CL14.

Further, in the example of FIG. 10, the third outer frame added to the alert clip is shown by the dotted line; however, as described above, an outer frame with a more conspicuous color than the first outer frame with the yellow color, and the like may be used.

The clips CL15 to CL18 shown by the bidirectional arrow P are the clips for attention, and the first outer frame as the first mark is added to an outer periphery of each of the clips CL15 to CL18. In the example of FIG. 10, the first outer frame is shown by the bold line; however, as described above, an outer frame with a conspicuous color such as red, and the like may be used.

The clip CL20 is the easy clip, and a second outer frame as the second mark is added to an outer periphery of the clip CL20. In the example of FIG. 10, the second outer frame is shown by the dashed line; however, as described above, an outer frame with an inconspicuous color such as a green color, and the like may be used.

When content is reproduced at the time of the final editing confirmation, the clip CL11 which is the ordinary clip is first reproduced. Since the outer frame is not added to the clip CL11, the editor notes the final editing confirmation will be performed with ordinary attention.

Next, the clips CL12 to CL14, which are alert clips, are reproduced. Since the conspicuous third outer frame is added to the clips CL12 to CL14, it is reported to the editor that the reproduction of a clip for attention on which a confirmation operation is performed with concentration is approaching. Through the report, the editor is alerted. Thus, since the editor is able to move to a state of concentration while the clips CL12 to CL14 are reproduced, it is possible for the editor to perform the final editing confirmation while maintaining a state of concentration when a clip for attention is reproduced.

Next, the clips CL15 to CL18 which are the clips for attention are reproduced. Since the first outer frame is not added to the clips CL15 to CL18, the editor notes the final editing confirmation will be performed with concentration. Since the total count of reproductions for partial editing confirmation is the first threshold value or less, each of the clips CL15 to CL18 might not be sufficiently confirmed by the editor at the time of the partial editing confirmation. Accordingly, the editor performs the final editing confirmation while concentrating while the clips CL15 to CL18 to which the first outer frame is added are reproduced at the time of the final editing confirmation, so that confirmation is performed without leakage of information.

Next, the clip CL19 which is the ordinary clip is reproduced. Since the outer frame is not added to the clip CL19, the editor notes the final editing confirmation will be performed with usual attention.

Next, the clip CL20 which is the easy clip is reproduced. Since the second outer frame is added to the clip CL20, the editor notes the final editing confirmation is performed to some extent in an easy manner.

Referring again to the flowchart of FIG. 9, in step S72, the determination unit 192 of the reproduction processing unit 133 for final editing confirmation determines whether a final clip is reproduced.

When the final clip is not reproduced, No is determined in step S72, the corresponding processing returns to step S62, and the subsequent processing is repeated. That is, a loop processing of steps S62 to S72 is repeated until the final clip is reproduced, so that a different mark is added to each type of clip to thereby display a moving image.

Thereafter, when the final clip is reproduced, the reproduction process for final editing confirmation is completed. That is, the process of step S5 of FIG. 4 is completed, and the reproduction process for confirmation is completed.

In this manner, since the different mark is added to each type of clip at the time of the final editing confirmation, it is possible for the editor to easily recognize the level of concentration necessary for the final editing confirmation. Accordingly, it is possible for the editor to pay attention to the final editing confirmation in which high level concentration is necessary, so that confirmation without leakage of edited content is facilitated while the attention is not distracted.

In addition, for anyone other than the editor, it is possible to easily recognize the importance of the clip which is to be confirmed with a particular level of concentration during final editing confirmation. That is, when anyone other the editor performs the final editing confirmation, it is necessary that anyone other the editor confirm a clip having a possibility that the editing confirmation has not been performed by the editor with sufficient concentration. Accordingly, anyone other than the editor performs the final editing confirmation with respect to the clip for attention with particular concentration, so that it is possible to easily perform confirmation without leakage of edited content.

Figure 11A:
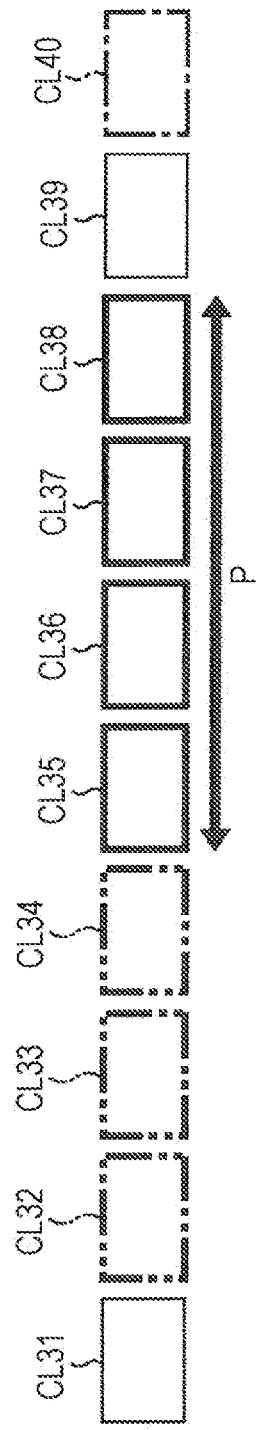
FIGS. 11A and 11B are diagrams for describing another specific example of reproduction for final editing confirmation.
Figure 11B:
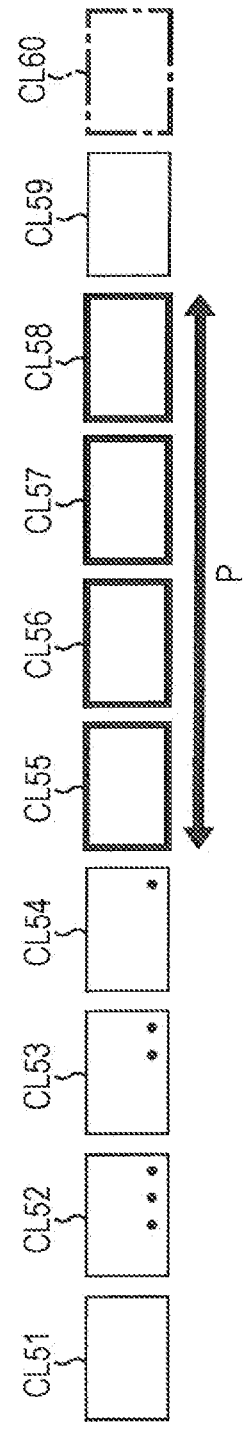

FIGS. 11A and 11B are diagrams for describing another specific example of reproduction for final editing confirmation.

In FIGS. 11A and 11B, clips CL31 to CL40 and CL51 to CL60 from among clips constituting the content are shown. The clips CL31 to CL40 and CL51 to CL60 are continuously reproduced in the stated order, respectively. Further, in an example of FIGS. 11A and 11B, since the clip for attention, the easy clip, and the ordinary clip are the same of those of FIG. 10, descriptions thereof will be omitted, and only the alert clip will be described.

Clips CL32 to CL34 of FIG. 11A are the alert clips, and the third outer frame is added thereto. The third outer frame is shown by the two-dot chain lines. The third outer frame added to the clips CL32 to CL34 is a flickering outer frame. That is, as for the third outer frame, the type of line and color thereof are arbitrarily set; however, a conspicuous outer frame is used to alert the editor.

At the time of the final editing confirmation, for example, the flickering third outer frame is added to the clips CL32 to CL34 which are alert clips, so that the clips CL32 to CL34 are reproduced. In this manner, the third outer frame is flickered, so that it is reported to the editor that the reproduction of the clip for attention on which the confirmation operation has to be performed while concentrating is approaching.

Through the report, the editor is alerted. That is, since the editor is able to move to a state of concentration immediately before reproducing the clip for attention, it is possible to perform the final editing confirmation while maintaining the state of concentration.

Clips CL52 to CL54 of FIG. 11B are the alert clips, and a mark (hereinafter, referred to as an indicator) having a function of displaying the interval until the reproduction of the clip for attention starts is shown as a third mark. The indicator as the third mark of FIG. 11B is displayed as a circular mark at the lower right part of the display unit 111 in which the content is displayed. In the clip CL52, three circular marks are displayed as the indicator. In the clip CL53, two circular marks are displayed as the indicator. In the clip CL54, a single circular mark is displayed as the indicator. That is, as the clip for attention approaches, the number of circular marks displayed, which is the indicator, is displayed so as to sequentially decrease, such as 3, 2, and 1. That is, in this example, the number of circular marks displayed indicates the interval until the reproduction of the clip for attention starts. Instead of the number of circular marks displayed, numbers such as 3, 2, and 1 may be used as the indicator.

At the time of the final editing confirmation, the clips CL52 to CL54 which are the alert clips are reproduced in such a manner as that the indicator as the third mark is displayed, and the number of indicators displayed decreases as the clip for attention approaches. In this manner, the number of indicators displayed as the third mark decreases, so that it is reported to the editor that the clip to which the editor will pay attention is approaching. Through the report, the editor is alerted. That is, since the editor is able to move to a state of concentration immediately before reproducing the clip for attention, it is possible to perform the final editing confirmation while maintaining the state of concentration when the clip for attention is reproduced. Further, the indicator may be flickered in a combination of the examples of FIGS. 11A and 11B.

Figure 12:
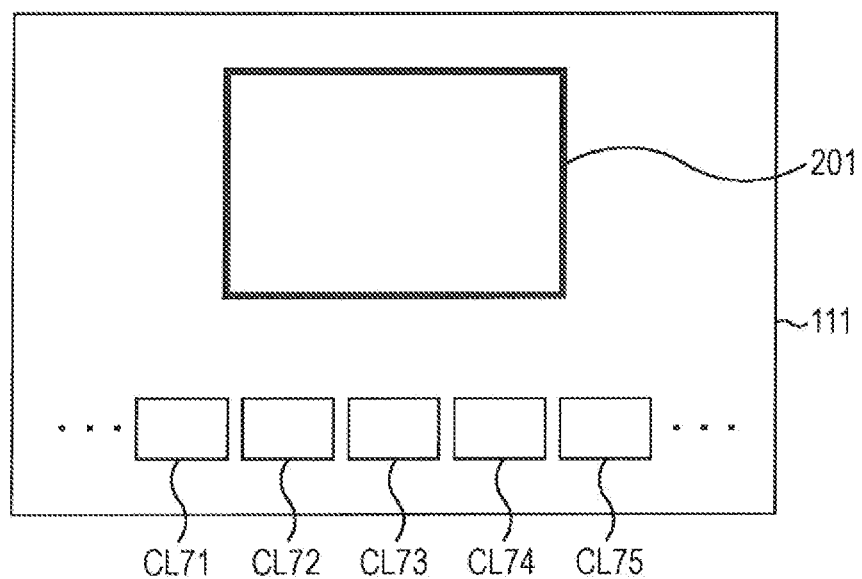
FIG. 12 is a diagram for describing another specific example of reproduction for final editing confirmation.

FIG. 12 is a diagram for describing another specific example of reproduction for final editing confirmation.

In a lower side of the display unit 111 of FIG. 12, a thumbnail of each of the clips CL71 to CL75 which are a part of the clips constituting the content is displayed. In addition, in a display region 201, content after editing is displayed. In a case of FIG. 12, the first to third marks are added to the content displayed in the display region 201. In this manner, since the content to which a different mark is attached to each type of clip is reproduced in the display region 201 at the time of the final editing confirmation, it is possible for the editor to easily recognize the level of concentration necessary for the final editing confirmation.

In this embodiment, when the data of the content is partially edited, the total count of reproductions for partial editing confirmation is measured, the type of the mark added to the clip is determined in accordance with the total count. In this case, a measurement target of the total count is regarded as reproduction of a single item of clip data, or reproduction of scene data which is a part of the clip data in the present embodiment. However, the measurement target of the total count is not particularly limited.

For example, since a strong sense of incongruity is applied to the viewer at the time of reproduction of the content when a connection between the clips is unnatural, it is necessary for the editor to confirm the edited content of the connection point between the clips with particular concentration at the time of the final editing confirmation. Accordingly, for example, the measurement target of the reproduction for partial editing confirmation may be regarded as the number of reproductions of the connection point between the clips.

That is, the edition unit 151 edits the connection point of the corresponding clip data by performing an image process for applying visual effects such as cuts, fade-in, fade-out, and the like with respect to the connection point of the edition target.

The measurement unit 152 increments the number of reproductions by 1 each time the reproduction for partial editing confirmation of the connection point that is edited by the edition unit 151 through the control of the reproduction control unit 134 is performed, so that the total count of reproductions for partial editing confirmation is measured. In this instance, if reproduction is continually performed several seconds before the end point of a clip present before the connection point, and several seconds after the start point of a clip present after the connection point, the reproduction for partial editing confirmation of the connection point is performed, so that the total count is measured. Accordingly, it is not necessary that all of the clips are reproduced at the time of the reproduction for partial editing confirmation. Further, in a case in which content of the clip before and after the connection point due to the editing is changed, it is necessary to perform the time of the final editing confirmation while concentrating, so that the measurement unit 152 resets the total count of reproductions for partial editing confirmation to zero.

The clip setting unit 173 sets a clip to be processed to any one of the easy clip, the clip for attention, and the ordinary clip in accordance with the total count of reproductions for partial editing confirmation of the connection point. That is, the clips before and after the connection point in which the total count of reproductions for partial editing confirmation is smaller are set as the clip for attention, clips before and after the connection point in which the total count is larger are set as the easy clip, and the other clips are set as the ordinary clip.

The mark adding unit 193 adds a different mark to each type of clip at the time of the reproduction for final editing confirmation. That is, the mark adding unit 193 adds the first mark to the clip for attention, and adds the second mark to the easy mark. In addition, the mark adding unit 193 adds the third mark to the alert clip in which at least one of the clips for attention is included in each of clips of m clips ahead to be reproduced henceforth, from among the ordinary clips.

The reproduction control unit 134 performs a control for reproducing the clip data of the clip in which data of the different mark is added to each type of clip.

In this manner, since the content is reproduced by adding the different mark to each type of clip at the time of the final editing confirmation, it is possible for the editor to easily recognize the level of the concentration necessary for the final editing confirmation of the connection point. Accordingly, it is possible for the editor to pay attention to the final editing confirmation in which high level concentration is necessary, so that confirmation without leakage of edited content is facilitated while attention is not distracted.

In addition, as a target of the measured editing operation, both the scene data within the clip and the connection point between the clips may be used. In this case, the editor notes the final editing confirmation will be performed with high level of attention to both the content data within the clip and the connection point by distinguishing the display of the added mark.

Further, as described above, the clip to be processed is classified into any one of the easy clip, the clip for attention, and the ordinary clip in accordance with the total count of reproductions for partial editing confirmation. However, without being limited thereto, it is possible for the editor to classify the clip to be processed into an arbitrary number of types of clip, and to set a threshold value of the arbitrary number for this.

In addition, as described above, the classification of the clips is performed in accordance with the total count of reproductions for partial editing confirmation. However, the classification of the clips may be designated by the editor. That is, by operating the input unit 26, the editor may set, to the clip for attention, the clip which has to be confirmed with greater concentration at the time of the final editing confirmation while being even the clip in which the total count of reproductions for partial editing confirmation is larger. In addition, by operating the input unit 26, the editor may set, to the easy clip, the clip which may be confirmed in an easy manner at the time of the final editing confirmation while being even the clip in which the total count of reproductions for partial editing confirmation is smaller. Furthermore, as the mark, a line, a figure, and the like other than a frame and a circular figure may be used.

[Application to Program of Present Disclosure]

The series of processes described above is performed by hardware or software.

In a case in which the series of processes is performed by software, a program constituting the software is installed from a network or a recording medium on a computer with built-in dedicated hardware, or in a general-purpose personal computer, and the like in which a variety of functions are executed by installing a variety of programs.

As shown in FIG. 1, the recording medium including the above described program may be distributed to provide the program to a user separately from a main body of the device, and include the ROM 22 in which a program provided to the user in a state of being built into the main body of the device in advance is recorded, the hard disk included in the storage unit 29, or the like, as well as including a magnetic disk (including a floppy disk) in which a program is stored, an optical disc (including CD-ROM (Compact Disk-Read Only Memory) and DVD (Digital Versatile Disc)), a magneto-optical disc (including MD (Mini-Disc)), a semiconductor memory, or the like.

Further, throughout the present specification, steps for describing the program recorded on the recording medium may include a process performed in chronological order along the order of the steps, and a process performed in parallel or separately performed while being necessarily processed in the chronological order.

The present disclosure may be applied to an editing device for performing editing of the content.

The present disclosure contains subject matter related to that disclosed in Japanese Priority Patent Application JP 2010-2310005 filed in the Japan Patent Office on Oct. 13, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An editing device, comprising: one or more processors being operable to:
    perform one or more first reproductions for partially editing content comprising a plurality of clips;
    measure a total count of the one or more first reproductions, wherein the one or more first reproductions are performed within each clip of the plurality of clips and a connection point between two adjacent clips of the plurality of clips;
    set each of the plurality of clips to one of a plurality of types of clips based on the measured total count, wherein a first type of the plurality of types of clips to be reproduced is configured to alert that at least one of a second type of the plurality of types of clips is included in each of a predetermined number of clips to be reproduced;
    add a mark in accordance with the set one of the plurality of types of clips to at least a part of the content; and
    control a second reproduction of the content based on the added mark;
    wherein the first type of the plurality of types of clips comprises an alert clip, the second type of the plurality of types of clips comprises a clip for attention, and a third type of the plurality of types of clips comprises one or more ordinary clips based on the total count of the one or more first reproductions, wherein the first type of the plurality of types of clips is a part of a third type of the plurality of types of clips; and
    wherein one or more clips from the third type of the plurality of types of clips comprises at least one of the second type of the plurality of types of clips, wherein the at least one of the second type of the plurality of types of clips is to be reproduced subsequent to one or more clips of the first type of the plurality of types of clips.

2. The editing device according to claim 1, wherein the one or more processors are operable to set, to the second type, a second set of clips in which the measured total count is equal to or lower than a first threshold value from each of the plurality of clips, set, to a third type, a third set of clips in which the measured total count is lower than a second threshold value or larger than the first threshold value, and set, to the first type, a first set of clips, and wherein the one or more processors are operable to add a second mark to the second set of clips set as the second type, and add a third mark to the third set of clips set as the third.

3. The editing device according to claim 2, wherein, when at least one of the second set of clips is included in each of one or more clips from the third set of clips ah ad to be reproduced, the one or more processors are operable to add a first mark to the first set of clips set as the first type.

4. The editing device according to claim 3, wherein the first mark is a mark that comprises a flickering signal.

5. The editing device according to claim 4, wherein the first mark is an outer frame disposed at an outer periphery of the first set of clips.

6. The editing device according to claim 1, further comprising:
an input unit that receives a plurality of instructions,
wherein the one or more processors are operable to set one of the plurality of types of clips based on the plurality of instructions received.

7. The editing device according to claim 1, wherein the one or more processors are operable to edit the connection point between the two adjacent clips of the plurality of clips, and measure part of the content as each single reproduction when the connection point is reproduced.

8. The editing device according to claim 1, wherein, when content of at least one of the two adjacent clips of the plurality of clips connected by a predetermined connection point is changed by editing, the one or more processors are operable to reset the total count of the one or more first reproductions of each of the two adjacent clips of the plurality of clips.

9. The editing device according to claim 1, wherein a first mark added to the first type of the plurality of types of clips indicates an interval until the second type of the plurality of types of clips to which a second mark is added is reproduced.

10. An editing method, comprising:
in an editing device comprising one or more processing units:
perform one or more first reproductions for partially editing content comprising a plurality of clips, wherein the one or more first reproductions are performed within each clip of the plurality of clips and/or a connection point between two adjacent clips of the plurality of clips;
measuring a total count of the one or more first reproductions of the plurality of clips and the connection point between the two adjacent clips of the plurality of clips;
setting each of the plurality of clips to one of a plurality of types of clips based on the measured total count, wherein a first type of the plurality of types of clips to be reproduced is configured to alert that at least one of a second type of the plurality of types of clips is included in each of a predetermined number of clips to be reproduced;
adding a mark in accordance with the set one of the plurality of types of clips to at least a part of the content; and
controlling a second reproduction of the content based on the added mark;
wherein the first type of the plurality of types of clips comprises an alert clip, the second type of the plurality of types of clips comprises a clip for attention, and a third type of the plurality of types of clips comprises one or more ordinary clips based on the total count of the one or more first reproductions, wherein the first type of the plurality of types of clips is a part of a third type of the plurality of types of clips; and
wherein one or more clips from the third type of the plurality of types of clips comprises at least one of the second type of the plurality of types of clips, wherein the at least one of the second type of the plurality of types of clips is to be reproduced subsequent to one or more clips of the first type of the plurality of types of clips.

11. The editing method according to claim 10, comprising performing the one or more first reproductions based on an adjustment of color, an adjustment of brightness, an insertion of a computer graphics (CG) image with respect to scene data included in each of the plurality of clips.

12. The editing method according to claim 10, comprising designating the plurality of clips to be processed from the content to be edited.

13. The editing method according to claim 10, comprising determining whether the total count of the one or more first reproductions is equal to or lower than a first threshold value, greater than the first threshold value and less than a second threshold value, or greater than the second threshold value.

14. The editing method according to claim 13, wherein the first threshold value and the second threshold value are set based on an input operation.

15. The editing method according to claim 10, comprising designating at least one of the one or more first reproductions as an alert clip, wherein the total count of the one or more first reproductions is greater than a second threshold.

16. The editing method according to claim 15, wherein the alert clip alerts for the one or more first reproductions having the total count equal to or less than a first threshold.

17. The editing method according to claim 10, wherein the first type of the plurality of types of clips is an alert clip comprising a flickering outer frame or a visual indicator.

18. A non-transitory computer-readable storage medium having stored thereon, a computer program having at least one code section for editing content, the at least one code section being executable by a computer for causing the computer to perform steps comprising:
perform one or more first reproductions for partially editing content comprising a plurality of clips, wherein the one or more first reproductions are performed within each clip of the plurality of clips and a connection point between two adjacent clips of the plurality of clips;
measuring a total count of the one or more first reproductions of the plurality of clips and the connection point between the two adjacent clips of the plurality of clips;
setting each of the plurality of clips to one of a plurality of types of clips based on the measured total count, wherein a first type of the plurality of types of clips to be reproduced is configured to alert that at least one of a second type of the plurality of types of clips is included in each of a predetermined number of clips to be reproduced;
performing an image process for adding a mark in accordance with the set one of a plurality of types of clips to at least a part of the content; and
controlling a second reproduction of the content based on the added mark;
wherein the first type of the plurality of types of clips comprises an alert clip, the second type of the plurality of types of clips comprises a clip for attention, and a third type of the plurality of types of clips comprises one or more ordinary clips based on the total count of the one or more first reproductions, wherein the first type of the plurality of types of clips is a part of a third type of the plurality of types of clips; and wherein one or more clips from the third type of the plurality of types of clips comprises at least one of the second type of the plurality of types of clips, wherein the at least one of the second type of the plurality of types of clips is to be reproduced subsequent to one or more clips of the first type of the plurality of types of clips.

* * * * *